(12) United States Patent
Jones et al.

(10) Patent No.: US 12,533,855 B2
(45) Date of Patent: Jan. 27, 2026

(54) COMPOSITE COMPONENT, METHOD OF MANUFACTURING A PREFORM FOR THE COMPONENT

(71) Applicant: ROLLS-ROYCE PLC, London (GB)

(72) Inventors: Christopher D Jones, Bristol (GB); Robert C Backhouse, Wells (GB); Adam J Bishop, Bristol (GB); Ian Buck, Loughborough (GB); Sarvesh Dhiman, Loughborough (GB)

(73) Assignee: ROLLS-ROYCE plc, London (GB)

( * ) Notice: Subject to any disclaimer, the term of this patent is extended or adjusted under 35 U.S.C. 154(b) by 210 days.

(21) Appl. No.: 18/220,932

(22) Filed: Jul. 12, 2023

(65) Prior Publication Data

US 2024/0025131 A1    Jan. 25, 2024

(30) Foreign Application Priority Data

Jul. 25, 2022  (GB) ..................................... 2210820

(51) Int. Cl.
*B29C 70/22*  (2006.01)
*B29L 31/30*  (2006.01)

(52) U.S. Cl.
CPC ..... *B29C 70/222* (2013.01); *B29L 2031/3076* (2013.01)

(58) Field of Classification Search
CPC ........... B29C 70/222; B29L 2031/3076; B29D 99/0005; B29D 99/0003; D03D 41/004; D03D 25/005
See application file for complete search history.

(56) References Cited

U.S. PATENT DOCUMENTS 4,379,798 A    4/1983  Palmer et al.
5,026,595 A    6/1991  Crawford, Jr. et al.
(Continued)

FOREIGN PATENT DOCUMENTS

EP    2 780 665 B1    2/2020
JP    H09-157993 A    6/1997
(Continued)

OTHER PUBLICATIONS

Dec. 7, 2023 Extended Search Report issued in European Patent Application No. 23183215.5.
(Continued)

*Primary Examiner* — Brian Handville
(74) *Attorney, Agent, or Firm* — Oliff PLC (57) ABSTRACT

A woven composite component for an aerospace structure or machine, comprising: a compound member extending from a junction with a feeder member, a noodle element extending in a weft direction through the junction. The feeder member comprises first and second feeder portions either side of the junction, each feeder portion comprising warp tows extending towards the junction. There is a compound set of warp tows extending from the first and second feeder portions, each turning at the junction to define warp tows for the compound member. There is a crossing set of warp tows belonging to the compound set, the crossing set comprising warp tows from the first feeder portion and warp tows from the second portion which cross each other at the junction to pass around the noodle element. There is also disclosed a method of manufacturing a preform for a woven composite component.

16 Claims, 4 Drawing Sheets

(56) References Cited

U.S. PATENT DOCUMENTS

| | | |
|---|---|---|
| 11,346,228 B1 | 5/2022 | Burdette et al. |
| 2006/0121809 A1 | 6/2006 | Goering |
| 2006/0130957 A1 | 6/2006 | Kostar et al. |
| 2011/0182743 A1 | 7/2011 | Naik |
| 2011/0318513 A1 | 12/2011 | Marsal et al. |
| 2013/0094898 A1 | 4/2013 | Seack et al. |
| 2014/0265020 A1 | 9/2014 | Hollander |
| 2014/0334935 A1 | 11/2014 | Dambrine et al. |
| 2015/0226071 A1 | 8/2015 | Marshall et al. |
| 2017/0190138 A1* | 7/2017 | Goering ............... B32B 5/024 |

FOREIGN PATENT DOCUMENTS

| | | |
|---|---|---|
| WO | 2010/053754 A1 | 5/2010 |
| WO | 2021/034327 A1 | 2/2021 |

OTHER PUBLICATIONS

Dec. 7, 2023 Extended Search Report issued in European Patent Application No. 23183216.3.
Jan. 20, 2023 Search Report issued in British Patent Application No. 2210823.7.
Jan. 20, 2023 Search Report issued in British Patent Application No. 2210820.3.
U.S. Appl. No. 18/220,922, filed Jul. 12, 2023 in the name of Christopher D Jones et al.
Apr. 9, 2025 Notice of Allowance Issued in U.S. Appl. No. 18/220,922.

\* cited by examiner

COMPOSITE COMPONENT, METHOD OF MANUFACTURING A PREFORM FOR THE COMPONENT

CROSS-REFERENCE TO RELATED APPLICATIONS

This specification is based upon and claims the benefit of priority from United Kingdom patent application number GB 2210820.3 filed on Jul. 25 2022, the entire contents of which is incorporated herein by reference.

BACKGROUND

Field of the Disclosure

The disclosure concerns a woven composite component having a compound member extending from a junction with a feeder member, with warp tows crossing each other at the junction around a noodle element.

Description of the Related Art

It is known to use composite materials comprising a matrix reinforced with fibre reinforcement material such as carbon fibre for components to provide a desirable combination of properties, such as strength and low weight.

It is known to form composite components by providing a lay-up comprising a plurality of plies of fibre reinforcement material, for example over a lay-up surface which defines a profile for the component.

Woven composite structures have been proposed for use in component manufacture owing to desirable properties relating to structural integrity. However, woven preforms are generally provided in sheets, which may be difficult to use to form a complex shape, such as a shape having multiple members. In particular, there are challenges in joining woven structures at a junction between members.

SUMMARY OF THE DISCLOSURE

According to a first aspect there is disclosed a woven composite component for an aerospace structure or machine, comprising:
- a compound member extending from a junction with a feeder member, a noodle element extending in a weft direction through the junction;
- wherein the feeder member comprises first and second feeder portions either side of the junction, each feeder portion comprising warp tows extending towards the junction;
- wherein there is a compound set of warp tows extending from the first and second feeder portions, each turning at the junction to define warp tows for the compound member;
- wherein, there is a crossing set of warp tows belonging to the compound set, the crossing set comprising warp tows from the first feeder portion and warp tows from the second portion which cross each other at the junction to pass around the noodle element.

It may be that the junction has a base side extending between the feeder portions and distal to the compound member, and a compound side at an interface between the junction and the compound member. It may be that the noodle element is located in an eye defined by the crossing set of warp tows, including warp tows from the first feeder portion that extend past the noodle on both the base side and the compound side; and warp tows from the second feeder portion that extend past the noodle on both the base side and the compound side.

It may be that the component comprises a plurality of noodle elements extending in the weft direction through the junction, each located in a respective eye defined by the crossing set of warp tows, including warp tows from the first feeder portion that extend past the noodle on both the base side and the compound side; and warp tows from the second feeder portion that extend past the noodle on both the base side and the compound side.

It may be that the first and second feeder portions each have a plurality of layers of weft tows through a thickness of the respective portion, defining therebetween warp tow depth positions. It may be that, for the or each noodle: (i) warp tows of the crossing set extend past the respective noodle to define the respective eye from at least two warp tow depth positions in the first feeder portion; and/or (ii) the warp tows of the crossing set extend past the respective noodle to define the respective eye extend from at least two warp tow depth positions in the second feeder portion.

The first feeder portion and/or the second feeder portion and/or the compound member may comprise a multi-layer weave. The or each multi-layer weave may selected from the group consisting of an angle interlock through-thickness weave, an angle interlock layer-to-layer weave; an orthogonal through-thickness weave and an orthogonal layer-to-layer weave.

The noodle may comprise a bundle of fibre-reinforcement material. A tow weight of the noodle may be greater than an average tow weight of weft tows in the composite component.

It may be that the feeder member is provided with one or more base plies of fibre reinforcement material extending from the first feeder portion to the second feeder portion, wherein the one or more base plies are not interwoven with the compound set. The woven composite component may comprise one or more capping plies, each of which: (i) forms part of the first feeder portion and part of a respective side of the compound member, wherein warp tows of the capping ply do not belong to the crossing set of warp tows; or (ii) forms part of the second feeder portion and part of a respective side of the compound member, wherein warp tows of the capping ply do not belong to the crossing set of warp tows.

It may be that one or more of the capping plies forms part of a multi-layer weave of the respective feeder portion and the compound member.

It may be that the compound member extends between two opposing feeder members, each feeder member having first and second feeder portions It may be that the component is of a type selected from the group consisting of: (i) a T-beam, (ii) an I beam (also known as an H-beam) and (iii) a vane or rotor section for a gas turbine engine, comprising a vane or rotor respectively defined by the compound member and one or more platforms defined by the or each feeder member.

According to a second aspect there is disclosed a method of manufacturing a preform for a woven composite component in accordance with any preceding claim, the method comprising weaving a multi-layer woven preform comprising:
- a compound region corresponding to the member of the composite component; and a feeder region corresponding to the feeder member and comprising first and second non-interwoven leaves which are superposed with respect to a thickness direction of the preform during weaving;

a junction between the feeder region and the compound region, comprising a noodle element extending along a weft direction of the woven preform wherein a compound set of warp tows extend from the first and second leaves, including a crossing set of warp tows which cross each other at the junction to pass around the noodle element;

separating the first and second leaves of the feeder region for forming the feeder member of the composite component.

The method may comprise: prior to insertion of the noodle element in the woven preform, causing a first subset of the crossing tows to cross each other along the thickness direction on a first side of the noodle with respect to a warp direction of the woven preform. The method may comprise inserting the noodle element into the woven preform along the weft direction. The method may comprise, after inserting the noodle element, causing a second subset of the crossing tows to cross each other along the thickness direction on a second side of the noodle with respect to the warp direction. Thereby the noodle element may be captured in an eye defined by the crossing tows.

BRIEF DESCRIPTION OF THE DRAWINGS

Embodiments will now be described by way of example only with reference to the accompanying drawings, which are purely schematic and not to scale, and in which.

DETAILED DESCRIPTION OF THE DISCLOSURE

Figure 1A:
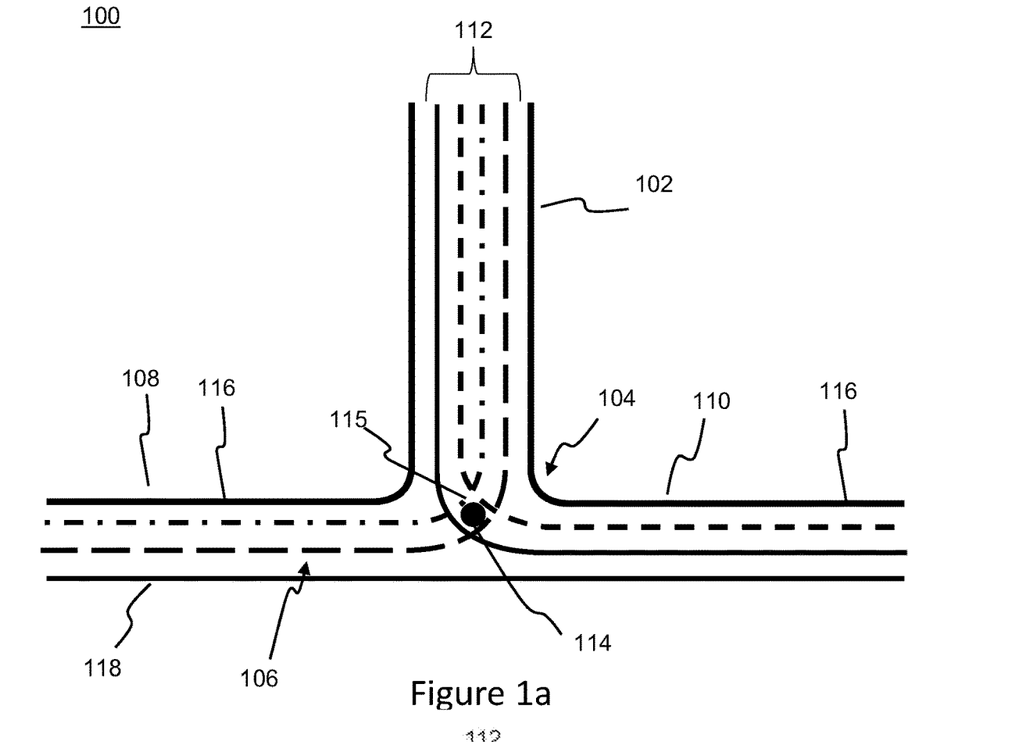
FIGS. 1a and 1b schematically shows cross-sections through woven composite components.

FIG. 1a schematically shows a cross-sectional view of an example composite component 100, comprising a compound member 102 extending from a junction 104 with a feeder member 106. As illustrated, the example composite component 100 is in the form of a T-piece, with the compound member 102 extending substantially orthogonally with respect to the feeder member 106 but it will be appreciated that other configurations are possible and envisaged in the context of the present disclosure.

Rather than being arranged contiguously end-to-end such that fibre-reinforcement material can extend straightforwardly into the compound member 102 from the feeder member, the compound member extends from a junction 104 mid-way along the feeder member. The feeder member 106 has first and second feeder portions 108, 110 disposed either side of the junction 104. Accordingly, the component 100 has a relatively complex shape owing to the joining together of multiple members.

FIG. 1a depicts layers of fibre-reinforcement material, in particular a compound set 112 of warp tows extending from the first and second feeder portions 108, 110 to the compound portion 102. As shown in FIG. 1a, some of the warp tows of the compound set 112 extend from the first feeder portion into the compound member 102 via the junction 104, whereas others extend from the second feeder portion into the compound member 102 via the junction 104.

Owing to the turning of the tows at the junction 104, there can be a reduction in fibre volume fraction within a formed composite component. For this reason, it has previously been considered to provide additional fibre reinforcement material at the junction in the form of a noodle element at the junction, for example comprising a bundle of fibre-reinforcement material. Such previous attempts have provided the noodle element in a central location of the junction, with two effectively separate sets of plies extending around the noodle on different sides.

However, the inventors have determined that in such arrangements the noodle element is poorly integrated with the woven structure in its preform state, therefore leading to difficulties in handing and manipulating the preform ready for forming a composite component.

According to the present disclosure, the inventors have determined that it can be advantageous to bind a noodle element 114 within the woven structure as shown in FIG. 1a. In particular, by causing the compound tows extending from opposing feeder portions 108, 110 to cross each other as they extend around the noodle element, the noodle element can be bound within the woven structure. Additionally, by causing the tows to cross and extend around the noodle element 114, the noodle element 114 acts as a guide for the profile of the woven structure, in particular by defining a specific location at which the tows are to turn along the lateral extent of the preform. Accordingly, a noodle may be inserted to not only reinforce and increase the fibre volume fraction at a junction, but also to ensure compliance with the intended location of the junction and where the fibre reinforcement material is to turn from the feeder member to the compound member.

As shown in FIG. 1a, there are several layers of warp tows through a thickness direction in each of the first and second feeder portions 108, 110. The compound set 112 of warp tows comprises a set of crossing tows, with each crossing tow crossing with a corresponding crossing tow from the opposing feeder portion at the junction as they pass around the noodle element 114. In the example of FIG. 1a, each compound tow is a crossing tow, but in other examples the set of compound tows may comprise warp tows which do not cross with a corresponding tow from the opposing feeder portion.

In the particular example shown in FIG. 1a, the crossing tows pass on two opposing sides of the noodle element 114 to define an "eye" 115 (i.e. a passageway delimited by the crossing tows) through which the noodle element extends. In particular, the component 100 has a base side extending between the feeder portions 108, 110 and distal to the compound member (i.e. away from the compound member) and a compound side at an interface between the junction and the compound member. The noodle element 114 is located in an eye 115 defined by the crossing set of warp tows, including warp tows from the first feeder portion that extend past the noodle on both the base side and the compound side, and warp tows from the second feeder portion that extend past the noodle on both the base side and the compound side.

Figure 1B:
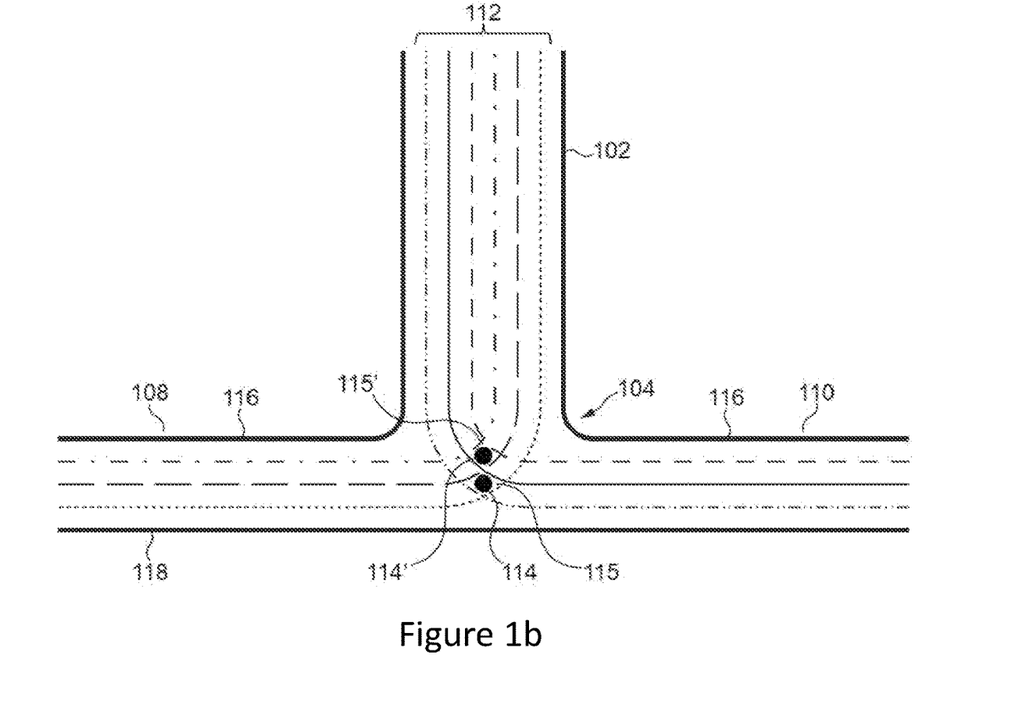

It should be appreciated that FIG. 1a is a simplified example and there may be more layers of fibre-reinforcement material which together define more eyes for noodle elements, and a junction may comprise one or more than one noodle elements extending through respective eyes. A variant example substantially as described above with respect to FIG. 1a, but comprising two noodle elements 114, 114' in respective eyes 115, 115' is shown in FIG. 1b. As shown in FIG. 1b, in this example there are commensurately more compound tows 112 which collectively define the eyes 115, 115'.

As stated above, the noodle element 114 may comprise a bundle of fibre-reinforcement material. The noodle element 114 may have a tow weight (corresponding to a number of fibre filaments) which is greater than a tow weight of the warp tows in the feeder member the compound member. For example, the noodle element may comprise a 12k tow (e.g. having a tow weight of 800 mg per meter), whereas the warp tows may comprise a 3k tow (e.g. having a tow weight of 200 mg per meter).

As shown in FIG. 1a, the component 100 comprises capping plies 116 extending from the first and second feeder portions 108, 110 to the compound portion 102. The capping plies 116 define an outer surface of the component, and do not cross or interlace with the crossing tows described above. The capping plies 116 may be applied as a separate layer of the preform from the compound tows 112, or may be formed integrally with the compound tows 112 in a multi-layer weave. By providing the capping plies, the component 100 may be provided with a relatively smooth outer profile, particularly at the junction, by overlaying the crossing tows.

As further shown in FIG. 1a, there is a base ply 118 extending from the first feeder portion 108 to the second feeder portion 110 and defining an outer surface of the feeder member on a side opposite the compound member 102. As with the capping plies 116, the base ply can provide a relatively smooth outer profile of the component, particularly at the junction where it overlays the crossing tows. In manufacturing, the base ply is applied as a separate layer of the preform after the compound tows 112 (including crossing tows) are woven to form the crossing structure shown in FIG. 1a. The capping plies 116 and the base ply may each be either a woven ply (for example a 2D weave, or a multi-layer weave), or a ply of unidirectional fibre-reinforcement material.

Figure 2A:
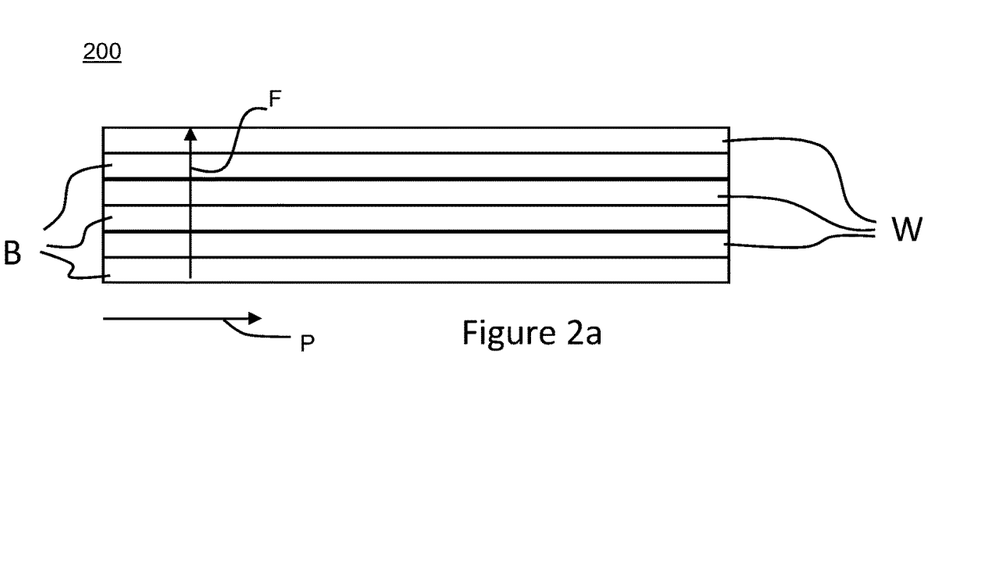
FIGS. 2a and 2b schematically shows a cross-section through a woven preform for a composite component.
Figure 2B:
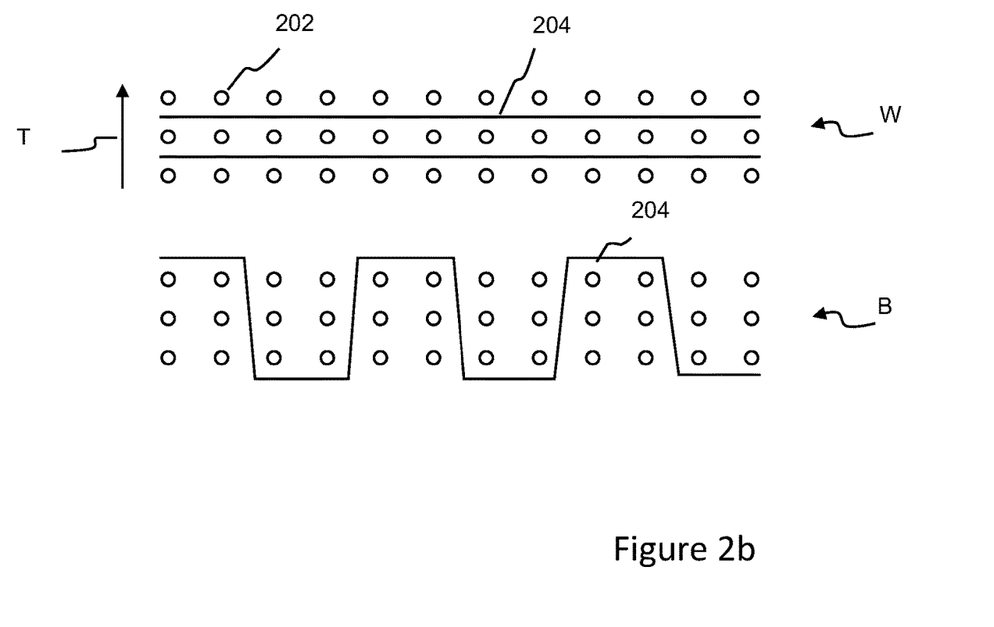

To aid the further discussion of multi-layer weaves, selected weave terminology is discussed below with reference to FIG. 2 (comprising FIGS. 2a and 2b). FIG. 2a shows an example woven structure 200 comprising a plurality of warp tows W, B extending along a warp direction P. Although not shown, the structure 200 further comprises a plurality of weft tows extending along a weft direction F. Although the disclosure extends to examples in which the woven composite or associated preform comprises two dimensional woven structures (i.e. rather than multi-layer woven structures as also disclosed herein), the example of FIG. 2 is a multi-layer structure. In a multi-layer weave, there are multiple layers of weft tows extending along a weft direction and layered in a thickness direction of the weave, with warp tows extending along a substantially orthogonal warp direction at respective locations along the weft direction. Each location along the weft direction occupied by one or more warp tows superposed on each other through the thickness direction is referred to herein and in the art as a "stack", such that there are a plurality of stacks defined along the weft direction by respective sets of one or more warp tows. A common configuration of stacks in a multi-layer weave is to provide an alternating arrangement of warp stacks W and binding stacks B as shown in FIG. 2, with binding stacks being stacks in which the or each warp tow is interlaced with weft tows to bind the weft tows (i.e. moving between layers of weft tows, or moving between warp tow positions defined between such layers), whereas warp stacks are stacks in which the or each warp tow extends without interlacing with weft tows (e.g. remaining between the same two layers of weft tows, or remaining at the same warp tow position).

FIG. 2b shows cross-sectional slices of the woven structure 200 normal to the weft direction F at lateral positions along the weft direction corresponding to a warp stack W and a binding stack B. The woven structure is described as a multi-layer woven structure herein as it comprises a plurality of layers of weft tows 202 (shown in cross section) defining a plurality of warp tow positions between the layers of weft tows. As shown in FIG. 2b, in the warp stack W the warp tows 204 extend along the warp direction at constant warp tow positions (i.e. remaining in the same warp tow position between weft layers). In contrast, in the binding stack B a warp tow 204 extends through the thickness direction of the woven structure between opposing sides to define a multi-layer weave pattern. In this particular example, the multi-layer weave type is an orthogonal through-thickness weave having a float number of two, meaning that each binding warp tow extends through the thickness from side to side of the woven structure, and passes over two weft tows before returning.

Figure 3A:
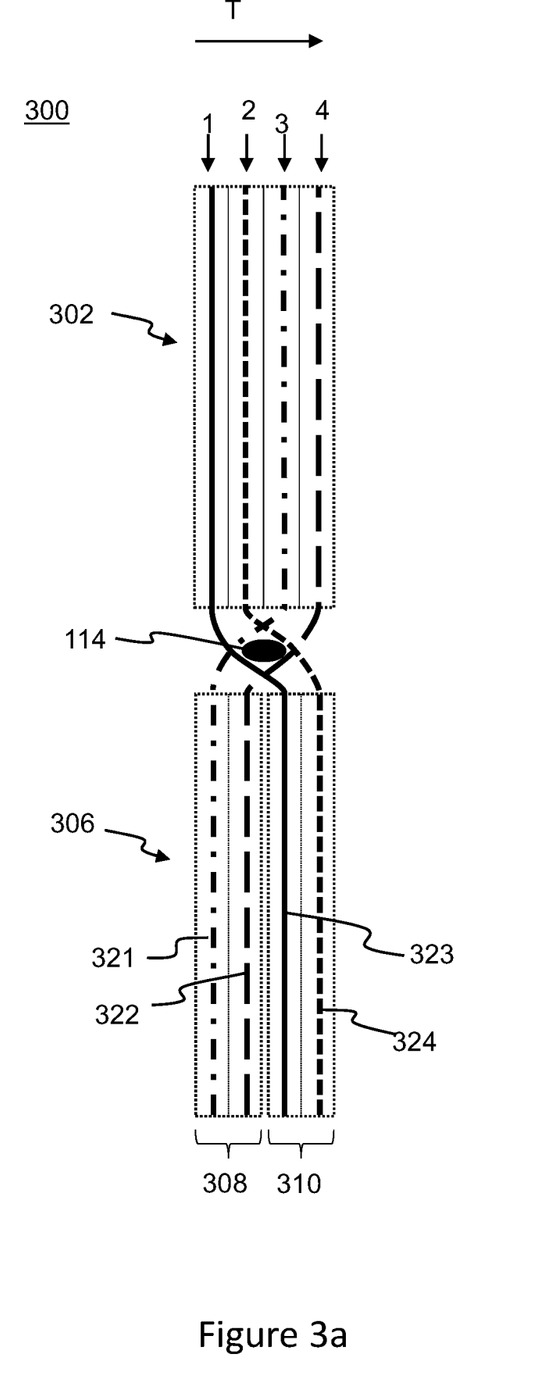
FIGS. 3a and 3b schematically show members of an example woven composite component.

FIG. 3A shows an example woven preform 300 for a warp stack for the example component 100 of FIG. 1a, shown in cross-section normal to the weft direction (i.e. in the plane of a thickness direction T and a longitudinal direction). The woven preform has a feeder region 306 corresponding to the feeder member 106 of FIG. 1a, and a compound region 302 corresponding to the compound member 102 of FIG. 1a. By way of simplified example, four warp tow positions are illustrated in each of the regions by boxes, with warp tows 321, 322, 323, 324 extending through adjacent warp tow positions along a thickness direction of the preform that will be referred to herein as warp tow positions 1, 2, 3, 4 respectively. Although not shown, the woven preform comprises a plurality of layers of weft tows extending orthogonal to the view of FIG. 3, so as to define the warp tow positions therebetween.

FIG. 3a shows the warp tows 321-324 extending longitudinally along the feeder region 306 until reaching a junction with the compound region 302, where the warp tows are woven around the noodle element 114 as described above with respect to FIG. 1a. As shown by the dashed lines separately circumscribing tow positions 1 and 2 (together) and 3 and 4 (together), the feeder region 306 comprises two leaves corresponding to the respective feeder portions 108, 110 of the composite component 100 of FIG. 1a, with first and second warp tows 321, 322 extending through a first leaf, and third and fourth tows 323, 324 extending through a second leaf in this example.

The first tow 321 extends from the first warp tow position 1 within the first leaf of the feeder region 306 to the third warp tow position 3 within the compound region 302, passing the noodle element 114 on a side proximal to the compound region 302 (a "compound side" as described above with reference to FIG. 1a), and crossing with third and fourth tows 323, 324 from the second leaf.

The second tow 322 extends from the second warp tow position 2 within the first leaf of the feeder region 306 to the fourth warp tow position 4 within the compound region 302, passing the noodle element on a side proximal to the feeder region 306 (a "base side" as described above with reference to FIG. 1a), and crossing with third and fourth tows 323, 324 from the second leaf.

The third tow 323 extends from the third warp tow position 3 within the second leaf of the feeder region 306 to the first warp tow position 1 within the compound region 302, passing the noodle element 114 on a side proximal to the feeder region 306 (the "base side" as described above), and crossing with first and second tows 321, 322 from the first leaf.

The fourth tow 324 extends from the fourth warp tow position 4 within the second leaf to the second warp tow position 2 within the compound region 302, passing the noodle element 114 on a side proximal to the compound region 302 (the "compound side" as described above), and crossing with first and second tows 321, 322 from the first leaf. The above example illustrates how crossing tows passing each other and around the noodle element can together define an eye for the noodle element to pass through.

The expression "leaf" is used with respect to the two leaves of the feeder region 306 because these two separate portions are separable from one another away from the junction, so as to form a feeder member 106 as described above with respect to FIG. 1a. In particular, it will be appreciated that in a multi-layer weave structure, binding warp tows in binding stacks of the weave in the feeder region n306 may only extend between warp tow positions associated with the respective leaf, such that the leaves remain separable. In contrast, warp tows (e.g. the same warp tows) may extend to other warp tow positions or throughout a thickness of the weave in the compound region.

In the example described above with respect to FIG. 3a, the warp tows 321-324 that cross each other are located in the same stack, such that away from the junction they are superposed on one another along the thickness direction. Accordingly, it should be appreciated that the crossing of the warp tows necessitates a lateral deflection of the warp tows at the point of crossing. It is thought that this can be accommodated owing to the generally lower fibre volume fraction in the location of the junction in the formed component 100, where two feeder portions of relatively low thickness combine to provide a compound tow having a greater thickness.

Figure 3B:
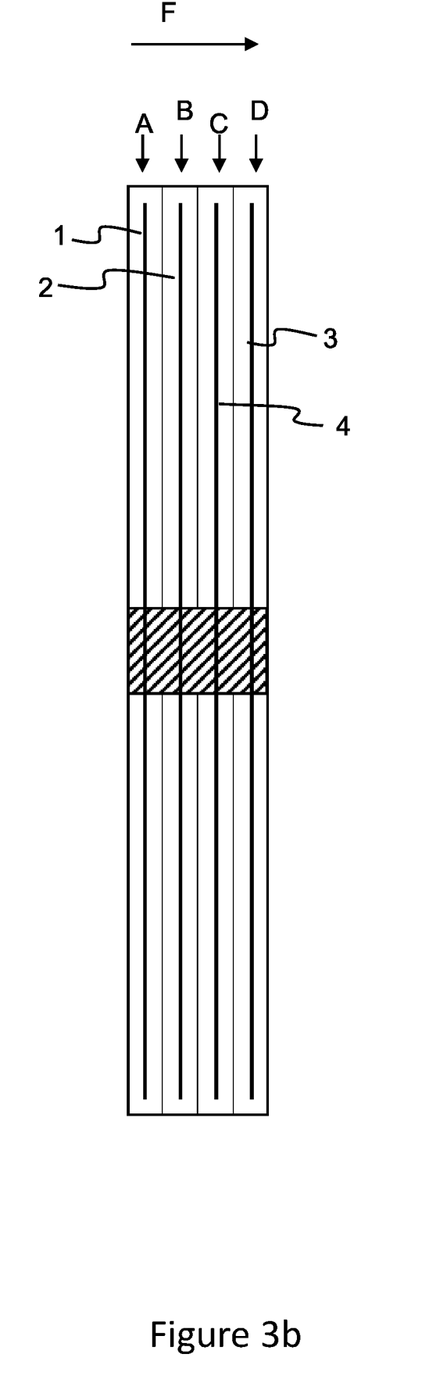

It should be appreciated that each individual stack in a multi-layer weave need not have a quantity of warp tows sufficient for defining an eye for the noodle—i.e. with warp tows from both leaves extending past the noodle on both the compound and base sides, crossing with the respective other tows to define the noodle. Instead, the eye for the noodle may be cumulatively defined by several stacks of the weave. In particular, some stacks may comprise fewer warp tows than the minimum of four required to create the structure defined above. By way of example, FIG. 3b shows four laterally adjacent stacks A, B, C, D over a longitudinal extent corresponding to that shown in FIG. 3a, and with a longitudinal position corresponding to the crossing location and noodle indicated in hatching. In the variant example of FIG. 3b, tows corresponding to the four tows 1-4 of FIG. 3a which collectively define the eye around the noodle element 114 are located in different stacks of the multi-layer weave, with tows 1-4 in stacks A-D respectively. In other examples, two or more (or all) of the respective tows defining the eye may be located in the same stack.

Nevertheless, it may be that in some examples, at least some of the stacks in the weave comprise warp tows configured to define an eye around the noodle within the stack itself.

Although FIG. 3a does not show features of a multi-layer weave away from the junction, this is because it depicts an example warp stack in which the warp tows extend generally longitudinally within respective warp tow positions, without inter-layer weaving. However, it should be appreciated that in binding stacks one or more warp tows may extend between warp tow positions within the feeder region 306 (e.g. within the respective leaf of the feeder region) and/or the compound region 302 to define a multi-layer weave. For example, in binding stacks the weave may comprise a layer-to-layer angle interlock weave, a through-thickness angle interlock weave, or an orthogonal through-thickness weave, all of which are terms of the art.

A method of manufacturing a preform for a woven composite component will now be described with reference to the preform 300 of FIG. 3a. The method comprises weaving a preform as described above with respect to FIG. 3a, and subsequently separating the feeder leaves of the feeder region, for subsequently forming a composite component having respective feeder portions 108, 110 as described above with respect to FIG. 1a. Separation of the leaves simply refers to re-orienting them to extend away from the junction in a manner corresponding to the arrangement of the feeder portions 108, 110 as shown in FIG. 1a.

The preform can be woven using a loom configured to receive warp tows from a warp tow supply, and configured to weave the warp tows around weft tows inserted along the weft direction as is known in the art. The loom may be of any suitable type as is known in the art. For complex weaves, the loom may be programmable (i.e. configured for computer control) to form the woven preform with weave patterns based on computer-readable instructions. Such a loom may be referred to as a computer-controlled jacquard loom.

As is known in the art, a loom can be controlled to separate respective sets of warp tows to define an opening for insertion of a weft tow between them. For example, a set of warp tows may be lifted to an upper side of the opening so as to pass over the weft tow, whereas another set may extend below the opening so as to pass under the weft tow. After insertion of the weft tow, the same or different sets of warp tows can then be repositioned to define another opening for reception of a weft tow.

To form the woven preform 300 as described above, the loom may be controlled so that a first subset of the crossing tows 112 are caused to cross each other along the thickness direction (e.g. by drawing a warp tow from a relatively higher warp tow position to an underside of an opening in the loom, and drawing a warp tow from a relatively lower warp tow position to an upper side of the opening) prior to insertion of the noodle element. The noodle element may then be received in the loom adjacent to the crossing tows (e.g. in the opening between them). After inserting the noodle element, a second subset of crossing tows may be caused to cross each other, for example by drawing a warp tow extending around an upper side of the noodle element to a relatively lower warp tow position, and by drawing a warp tow extending around a lower side of the noodle element to a relatively higher warp tow position. Accordingly, the first and second subsets of crossing tows can be oriented around the noodle element to define an eye for the noodle element as discussed herein.

To form a composite component from the preform, the preform may be transferred to a die or mould which defines a near net shape for the component, and a matrix material (such as a resin, for example epoxy resin) can be transferred to the die or mould. The matrix material and fibre-reinforcement can then be cured (for example under elevated temperature and/or pressure) to provide the formed composite component. A suitable fibre-reinforcement material for any reform or component disclosed herein may be carbon fibre, but it will be appreciated that any suitable fibre reinforcement material can be used.

While the composite component 100 of FIG. 1*a* has a T-piece configuration, as does the associated woven preform 300 of FIG. 3*a*, it should be appreciated that a component comprising a compound member and feeder member as described herein can take any suitable shape.

Figure 4:
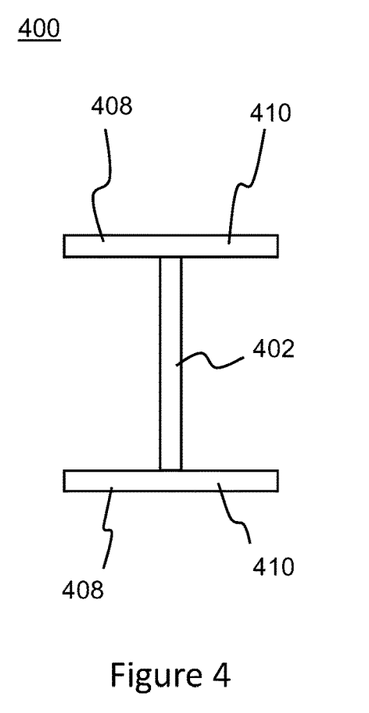
FIG. 4 schematically shows a further example woven composite component.

Merely as a further example, FIG. 4 shows an I-beam structure 400 that has two feeder members at either end of a compound member 402, each feeder member having respective first and second feeder portions 408, 410. As will be appreciated, the I-beam structure may be formed from a preform having a compound region with two feeder regions at either end, with respective junctions comprising noodle elements therebetween as discussed above.

Figure 5:
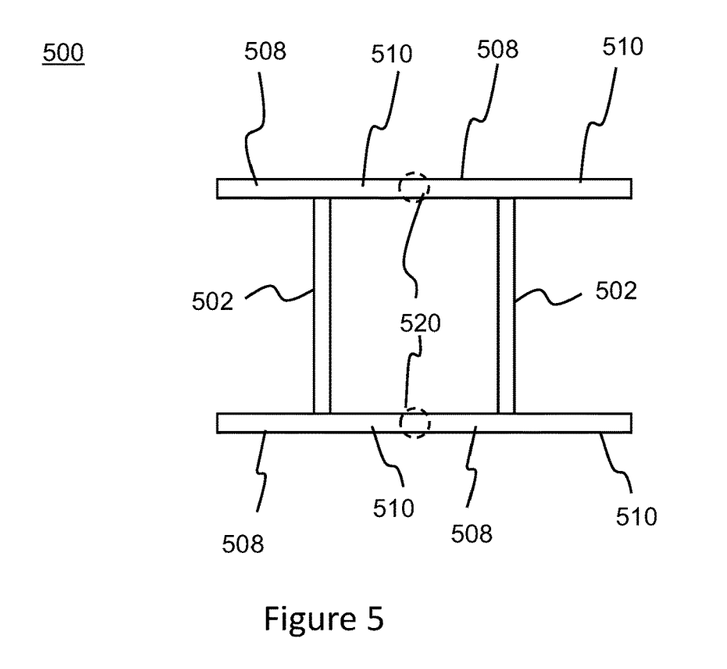
FIG. 5 schematically shows an example composite component.

A further example composite component 500 is shown in FIG. 5. The component 500 is a twin-vane section for a gas turbine engine, having compound members 502 and feed members (having feeder portions 508, 510) as described above forming aerodynamic vanes and platforms respectively. While shown schematically in FIG. 5, the component 500 may be semi-annular for integration into an annular ring of like components disposed around a central axis. The platforms formed of the feeder portions 508, 510 may extend substantially circumferentially, whereas the vanes formed of the compound members 502 may extend substantially radially.

The component 500 has a construction corresponding to two I-beams (such as those described above with respect to FIG. 4) having joined feeder portions 508, 510. FIG. 5 shows join locations 520 where a join may be provided between feeder portions 508, 510 associated with respective compound members 502. Such a join may be formed by base and capping plies as described herein, in addition to other known joining methods such as through-thickness stitching, tufting. A further method of joining at a join location may be to provide the respective feeder portions with a tapering profile in which layers of the multi-layer structure terminate at staggered positions along the elongate extent of the portion. For example, an offset between terminal positions of layers may be approximately 25 mm. For example, in a 5 layer structure layers may progressively terminate at positions 6.25 mm apart to form a tapered profile over a 25 mm longitudinal extent. The opposing feeder portion for the join may be provided with a corresponding tapered profile and the two may be overlayed for joining, for example in a subsequent resin transfer process and by any of the joining methods discussed above. Capping or base plies as described herein may be extended over the join for improved structural integrity and load transfer.

Although the examples of the disclosure refer to T-piece, I-beam and twin-vane components, it should be appreciated that these are exemplary only and the concepts of the disclosure apply to all components having a member that extends from a junction with one or more other members/portions, such that fibre reinforcement material extends into a compound member of the component from two (or more) feeder portions of the component. Other example components include rotor discs, support structures, spars, stringers, support beams, ribs, whether for use in an aerospace apparatus or machine (e.g. an airframe or a propulsion device such as a gas turbine engine) or for other (non-aerospace) uses.

We claim:

1. A woven composite component for an aerospace structure or machine, the woven composite component comprising:
   a compound member extending from a T-piece junction with a feeder member, a noodle element extending in a weft direction through the T-piece junction; wherein
   the feeder member comprises first and second feeder portions on either side of the T-piece junction, each of the first and second feeder portions comprising warp tows extending towards the T-piece junction;
   there is a compound set of the warp tows extending from the first and second feeder portions, each turning at the T-piece junction to define the warp tows for the compound member;
   there is a crossing set of warp tows belonging to the compound set, the crossing set comprising warp tows from the first feeder portion and warp tows from the second feeder portion which cross each other at the T-piece junction to pass around the noodle element; and
   a number of the warp tows in the compound member is greater than a number of the warp tows individually in the first and second feeder portions.

2. The woven composite component of claim 1, wherein the T-piece junction has a base side extending between the feeder portions and distal to the compound member, and a compound side at an interface between the T-piece junction and the compound member; and
   wherein the noodle element is located in an eye defined by the crossing set of warp tows, including warp tows from the first feeder portion that extend past the noodle element on both the base side and the compound side; and warp tows from the second feeder portion that extend past the noodle element on both the base side and the compound side.

3. The woven composite component of claim 2, comprising a plurality of the noodle elements extending in the weft direction through the T-piece junction, each located in a respective eye defined by the crossing set of warp tows, including warp tows from the first feeder portion that extend past the noodle elements on both the base side and the compound side; and warp tows from the second feeder portion that extend past the noodle elements on both the base side and the compound side.

4. The woven composite component of claim 2, wherein the first and second feeder portions each have a plurality of layers of weft tows through a thickness of the respective portion, defining therebetween warp tow depth positions; and
   wherein, for the noodle element:
   warp tows of the crossing set extend past the noodle element to define the respective eye from at least two warp tow depth positions in the first feeder portion; and/or
   the warp tows of the crossing set extend past the noodle element to define the respective eye extend from at least two warp tow depth positions in the second feeder portion.

5. The woven composite component of claim 1, wherein the first feeder portion and/or the second feeder portion and/or the compound member comprises a multi-layer weave.

6. The woven composite component of claim 5, wherein the multi-layer weave is selected from the group consisting of: an angle interlock through-thickness weave; an angle interlock layer-to-layer weave; an orthogonal through-thickness weave; and an orthogonal layer-to-layer weave.

7. The woven composite component of claim 1, wherein the noodle element comprises a bundle of fibre-reinforcement material.

8. The woven composite component of claim 7, wherein a tow weight of the noodle element is greater than an average tow weight of weft tows in the composite component.

9. The woven composite component of claim 1, wherein the feeder member is provided with one or more base plies of fibre reinforcement material extending from the first feeder portion to the second feeder portion, wherein the one or more base plies are not interwoven with the compound set.

10. The woven composite component of claim 1, comprising at least one capping ply, which:
   forms part of the first feeder portion and part of a respective side of the compound member, wherein warp tows of the capping ply do not belong to the crossing set of warp tows; or
   forms part of the second feeder portion and part of a respective side of the compound member, wherein warp tows of the capping ply do not belong to the crossing set of warp tows.

11. The woven composite component of claim 10, wherein the at least one capping ply forms part of a multi-layer weave of the respective feeder portion and the compound member.

12. The woven composite component of claim 1, wherein the compound member extends between two opposing feeder members, each feeder member having first and second feeder portions.

13. The woven composite component of claim 1, wherein the component is of a type selected from the group consisting of:
   a T-beam;
   an I beam or H-beam; and
   a vane or rotor section for a gas turbine engine, comprising a vane or rotor respectively defined by the compound member and one or more platforms defined by the or each feeder member.

14. A method of manufacturing a preform for the woven composite component in accordance with claim 1, the method comprising
   weaving a multi-layer woven preform comprising:
      a compound region corresponding to the compound member of the composite component;
      a feeder region corresponding to the feeder member and comprising first and second non-interwoven leaves which are superposed with respect to a thickness direction of the multi-layer woven preform during weaving;
      the T-piece junction between the feeder region and the compound region, comprising the noodle element extending along a weft direction of the woven preform; and
      the compound set of warp tows extend from the first and second non-interwoven leaves, including a crossing set of the warp tows which cross each other at the T-piece junction to pass around the noodle element; and
   separating the first and second non-interwoven leaves of the feeder region for forming the feeder member of the composite component.

15. The method of claim 14, comprising:
   prior to insertion of the noodle element in the woven preform, causing a first subset of the crossing tows to cross each other along the thickness direction on a first side of the noodle with respect to a warp direction of the woven preform;
   inserting the noodle element into the woven preform along the weft direction; and
   after inserting the noodle element, causing a second subset of the crossing tows to cross each other along the thickness direction on a second side of the noodle with respect to the warp direction;
   thereby capturing the noodle element in an eye defined by the crossing tows.

16. The woven composite component of claim 1, wherein the number of the warp tows in the compound member is equal to a sum of the warp tows individually in the first and second feeder portions.

* * * * *